United States Patent [19]

Bates

[11] 3,724,690

[45] Apr. 3, 1973

[54] UNLOADING DEVICE FOR A CAPSULE-TRANSPORT PIPELINE SYSTEM

[75] Inventor: Homer J. Bates, Roswell, Ga.

[73] Assignee: Georgia Tech Research Institute, Atlanta, Ga.

[22] Filed: Oct. 28, 1971

[21] Appl. No.: 193,378

Related U.S. Application Data

[63] Continuation-in-part of Ser. Nos. 856,566, Sept. 10, 1969, abandoned, and Ser. No. 140,071, May 3, 1971.

[52] U.S. Cl..................214/52 C, 104/131, 104/155, 243/31
[51] Int. Cl.........................B65g 67/50, B65g 51/24
[58] Field of Search............214/52 C; 243/19, 31, 6; 104/130, 131, 138, 155

[56] References Cited

UNITED STATES PATENTS

| 736,690 | 8/1903 | Claghorn | 214/52 C |
| 1,813,625 | 7/1931 | Knox | 243/6 X |
| 1,883,964 | 10/1932 | Kramer | 104/131 |

*Primary Examiner*—Robert G. Sheridan
*Attorney*—Edward Taylor Newton et al.

[57] ABSTRACT

A pipeline transportation system for vehicles in which the motive force is low pressure air traveling at a velocity substantially at which the vehicles are swept along includes an arrangement for returning the vehicles to a transfer duct and, in their return, to be stopped and dumped by inverting and then righting them.

6 Claims, 4 Drawing Figures

PATENTED APR 3 1973 3,724,690

INVENTOR
HOMER J. BATES

BY Newton, Hopkins, & Ormsby
ATTORNEYS

UNLOADING DEVICE FOR A CAPSULE-TRANSPORT PIPELINE SYSTEM

CROSS REFERENCE TO RELATED APPLICATIONS

This application is an improvement in the parent and continuation-in-part applications Ser. No. 856,566, filed Sept. 10, 1969, now abandoned and Ser. No. 140,071, filed May 3, 1971 and is related to application Ser. No. 193,377, filed Oct. 28, 1971.

The above application and disclosures thereof are incorporated herein by reference.

BACKGROUND OF THE INVENTION

In the aforesaid application Ser. No. 193,377 filed concurrently herewith, there is disclosed a transportation system in which a transfer duct operatively couples an incoming pipeline to an outgoing pipeline and there are extensions of these two pipelines beyond the transfer duct respectively for leading a vehicle away from the transfer duct and returning the vehicle to the transfer duct. In the return guide arrangement, the concurrently filed copending application describes in general means for arresting the motion of the vehicle as it is returned and for inverting and then righting the vehicle to off-load its contents. The present invention is directed to specific apparatus for performing the off-loading operation.

BRIEF SUMMARY OF THE INVENTION

The present invention is directed to an inverting and righting mechanism for vehicles operating in a transportation system described generally above. The unloading station comprises in general a rotatable section having an opening in that portion thereof normally disposed uppermost. The rotating section is supported between two fixed sections of a return guide means and there is provided mechanism selectively for rotating the section first to invert and then to right a vehicle confined therewithin and having an open top disposed in registry with the opening in the section.

DETAILED DESCRIPTION OF THE INVENTION

Figure 1:
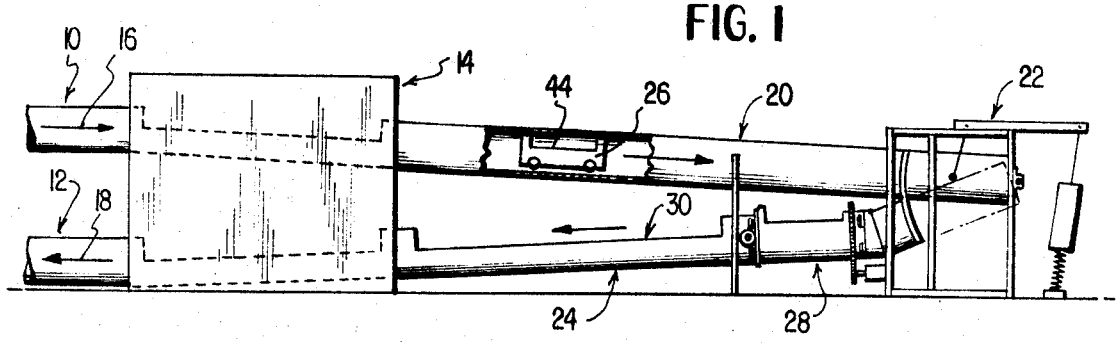

Reference to FIG. 1 will illustrate the general environment with which the present invention is associated. As shown, a first conduit means 10 and a second conduit means 12 are provided, both of which are associated with a transfer means indicated generally by the reference character 14. Means is provided in association with the two conduit means 10 and 12 and the transfer means 14 so as to create a low pressure air flow system which is operative to provide the motive force for propelling or sweeping along the vehicle or vehicles in the system. In FIG. 1, the arrow 16 indicates the direction of air flow in the first conduit means 14 which is leading to the transfer means 14 and the arrow 18 in the second conduit means 12 illustrates the direction of air flow leading away from the transfer means 14.

The first and second conduit means 10 and 12 emanate from a distance and, in this respect may emanate from a common region distant to the common region illustrated in FIG. 1 or they may lead to different stations which form part of the overall transportation system.

Beyond the transfer means 14, there is provided a first guide means indicated by the reference character 20 which leads away from the transfer means 14 towards a diverting station 22 and there is also provided a second guide means indicated by the reference character 24 leading from the diverting station 22 back to the transfer means 14. As is disclosed in detail in application Ser. No. 193,377, filed Oct. 28, 1971, the vehicle 26, in passing through the extension means 20, the diverting station 22 and returning through the extension 24 is essentially beyond the environment or influence of the air flow system and the arrangement is thus eminently suitable to perform the stopping, diverting, unloading and re-loading of the vehicle as hereinafter described without interfering with the motivating air flow system or being interfered with thereby.

The return extension means 24 includes an unloading station indicated generally by the reference character 28 and a re-loading station indicated generally by the reference character 30. Except for the details of the unloading station which will hereinafter be described in detail, the remainder of the system operates as is disclosed in the aforesaid application Ser. No. 193,377 and the subject matter of this application is incorporated herein by reference and, as well, the subject matters of applications Ser. Nos. 856,566 and 140,071 referred to and incorporated by reference in the aforesaid application Ser. No. 193,377 are also incorporated herein by reference.

Figure 2:
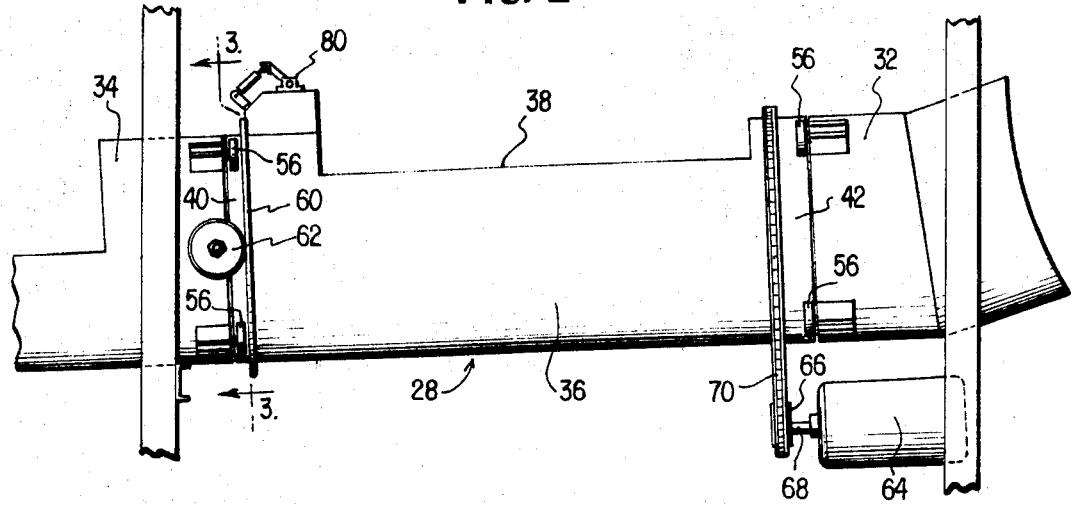

With reference to FIG. 2 wherein details of the unloading station are shown, it will be apparent that the return guide means 24 includes fixed, cylindrical sections 32 and 34 between which is interposed the unloading section 36, same being aligned with the fixed sections of 32 and 34 and supported therebetween. The section 36 is completely separate from the fixed sections 32 and 34 and is permitted of relative rotation with respect thereto. The normally uppermost portion of the section 36 is cut away as indicated by the reference character 38 so as to provide a top opening between the ends of the section 36 through which material from the vehicle 26 may be dumped by gravity when the section 36 is inverted as hereinafter described. The opposite ends of the section 36 are of cylindrical form as shown and present, at the extremities of the section 36, the two circular guide surfaces 40 and 42. Thus, the opening 38 is so arranged as to provide these guide surfaces 40 and 42 and, as well, to provide cylindrical sections at either end of this top opening 38 so as to retain the vehicle 26 within the confines of the section 36 when the section is inverted as hereinafter described. To this end, the top opening 44 in the vehicle, FIG. 1, is substantially coextensive in length with the top opening 38 of the section 36 so that the opposite ends of the vehicle 26 are positioned within the confines of the annular or cylindrical end portions of the section 36 beyond the opening 38 thereof. As is hereinafter described, means is provided in association with the section 36 positively to locate the vehicle 26 in proper relationship within the section 36 to obtain substantial registry between the top opening of the vehicle 26 and the top opening 38 of the section 36 not only to effect efficient dumping of the vehicular load through the opening 38 but also to preserve the retaining effect of the section.

It is to be noted that the section 36 is downwardly inclined toward the transfer means 14 and this, in itself, is operative to assist in the proper location of the vehicle within the section 36 by reason of the fact that it assures that the vehicle remains in engagement with the stop device hereinafter described. Also, the downward inclination of the section 36 allows the vehicle, after unloading, to roll by gravity from the unloading station 28 into the region of the loading station 30.

Figure 3:
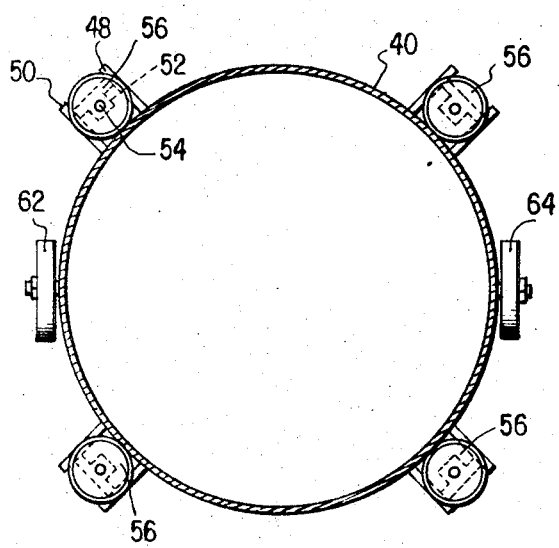

As is shown in FIG. 3, each of the fixed sections 32 and 34 carry a number of circumferentially spaced bracket ears such as those indicated by the reference character 48 and 50 which position bearing blocks 52 therebetween, one each for the axle 54 of each of the guiding and locating wheels 56. In this way, each end of the section 36 is held in alignment with its respective fixed sections 32 and 34 whereas at the same time permitting of relative rotation of the section 36. It is to be noted of course that the wheels 56 carried by the two end sections 32 and 34 engage upon the aforementioned circular or cylindrical end surfaces 40 and 42 of the section 36.

In addition to the above, the lower end of the section 36 is provided with an annular plate 60 and the fixed section 34 is provided with a pair of thrust wheels 62 and 64 as is shown in FIGS. 2 and 3 which bear against this annular plate 60 and axially locate the section 36 against its natural tendency to shift to the left in FIG. 2 due to the downward inclination thereof as previously described.

The means for effecting rotation of the section 36 may take the form of a suitable drive motor such as the electric motor 64 shown in FIG. 2 which is provided with a sprocket 66 on its drive shaft 68 which is in engagement with a chain 70 of endless form and which passes over one end section of the section 36 and engages suitable lugs or sprocket teeth formed circumferentially around the section so as to impart rotary motion thereto when the motor 64 is operated. Suitable control means (not shown) are provided for rotating the section 36 through 180° to an inverted position in which the contents of the vehicle 26 located therein are dumped through the now downwardly-facing opening 38 and thereafter the motor is operated to right the section 36 whereafter the vehicle is released to pass to the loading station 30.

Figure 4:
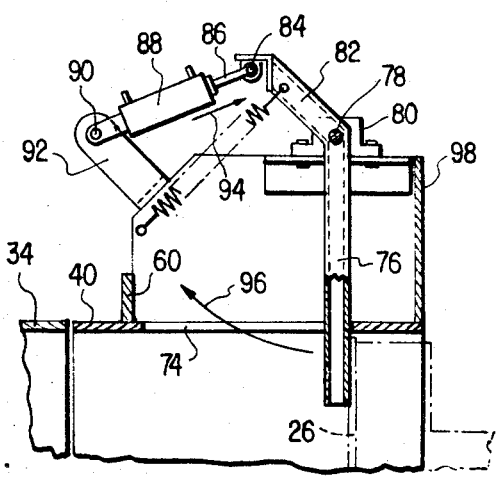

Various forms of latch means may be provided to position the vehicle 26 properly within the unloading section 36 and one such form is shown in detail in FIG. 4. As shown, the normally upperside of the section 36 is provided, in the lower cylindrical end section thereof with an elongate opening 74 through which a swingable latch bar 76 is passed, same being pivoted about the axis of the shaft 78 retained by the bearing block 80 on either side of this shaft. The latching device or bumper is provided with an arm extension 82 which is pivotally connected at 84 to one end of the piston rod 86 of a piston and cylinder assembly 88, the free end of which is pivotally anchored as at 90 to a suitable bracket 92 as shown. Thus, when the device 88 is actuated to move the piston 86 thereof in the direction of the arrow 94 in FIG. 4, the bumper or latch 76 will be swung arcuately in the direction indicated by the arrow 96 out of the way of the vehicle 26 allowing same to pass therebeyond and out of the section 36. Any suitable supporting mechanism 98 is provided on the unloading section 36 to support the bumper or latch assembly. Alternatively, the bumper assembly may be mounted on the fixed section 34 normally to be positioned within the end of the section 36 to prevent the vehicle 26 from passing therethrough and having suitable means for retracting same as will be evident.

What is claimed is:

1. In a transportation system of the type including first and second conduit means emanating from a distance and leading to a common region, means for creating a low pressure air flow system through said first conduit means toward said common region and through said second conduit means away from said common region, transfer means communicating said first and second conduit means for receiving air from said first conduit means and passing it to said second conduit means, first guide means for leading a vehicle away from said transfer means, second guide means for returning a vehicle to said transfer means, said first and second guide means having closely spaced free end portions remote from said transfer means, and means for receiving a vehicle from the free end portion of said first guide means and transferring it to the free end portion of said second guide means, the improvement wherein:

said second guide means includes a vehicle-unloading section and fixed sections at either end thereof and in alignment therewith, said vehicle-unloading section being completely separate from said fixed sections, said vehicle-unloading section having a top opening to allow vehicle-unloading by gravity therethrough;

support means interacting between the ends of said unloading section and said fixed sections for allowing rotation of said unloading section with respect to said fixed sections; and means for inverting said unloading section and returning it to upright position while a vehicle resides therein.

2. In a transportation system as defined in claim 1 wherein the top opening in said vehicle-unloading section presents cylindrical support surfaces at either end of such section, and said support means comprises a plurality of circumferentially spaced wheels carried by each of said fixed sections and engaging said cylindrical support surfaces.

3. In a transportation system as defined in claim 2 wherein said support means further includes an annular plate fixed to the guide surface at one end of said vehicle-unloading section, and wheel means carried by one of said fixed sections engaging the annular plate.

4. In a transportation system as defined in claim 3 wherein said vehicle-unloading section is inclined downwardly and said annular plate is fixed to the lower end thereof.

5. In a transportation system as defined in claim 4 wherein said means for inverting includes a drive motor and a sprocket driven thereby, and an endless chain trained about said sprocket and around said vehicle-unloading section.

6. In a transportation system as defined in claim 5 and including bumper means selectively operable to position a vehicle within said vehicle-unloading section during inversion and righting thereof and thereafter to permit the vehicle to flow by gravity from said vehicle-unloading section.

* * * * *